United States Patent
Birnbacher

(10) Patent No.: US 11,644,550 B2
(45) Date of Patent: May 9, 2023

(54) METHOD AND DEVICE FOR OPTICAL DISTANCE MEASUREMENT

(71) Applicant: Ibeo Automotive Systems GmbH, Hamburg (DE)

(72) Inventor: Wolfgang Birnbacher, Hamburg (DE)

(73) Assignee: Microvision, Inc., Redmond, WA (US)

( * ) Notice: Subject to any disclaimer, the term of this patent is extended or adjusted under 35 U.S.C. 154(b) by 753 days.

(21) Appl. No.: 16/744,430

(22) Filed: Jan. 16, 2020

(65) Prior Publication Data

US 2020/0225333 A1 Jul. 16, 2020

(30) Foreign Application Priority Data

Jan. 16, 2019 (EP) .................................... 19152055

(51) Int. Cl.
*G01S 7/4865* (2020.01)
*G01S 7/4861* (2020.01)
*G01S 17/08* (2006.01)

(52) U.S. Cl.
CPC .......... *G01S 7/4865* (2013.01); *G01S 7/4861* (2013.01); *G01S 17/08* (2013.01); *G01S 7/4866* (2013.01)

(58) Field of Classification Search
CPC .... G01S 7/4866; G01S 7/4861; G01S 7/4865; G01S 17/08
See application file for complete search history.

(56) References Cited

U.S. PATENT DOCUMENTS

| 2014/0333918 A1* | 11/2014 | Stutz | G01C 3/08 |
| | | | 356/5.01 |
| 2017/0184709 A1* | 6/2017 | Kienzler | G01S 7/4865 |
| 2020/0174120 A1* | 6/2020 | Steigemann | G01S 17/08 |

FOREIGN PATENT DOCUMENTS

| DE | 102017208704 A1 | 11/2018 |
| EP | 3418767 A1 | 12/2018 |

OTHER PUBLICATIONS

Search Report of European Application No. EP 19152055 dated Jul. 19, 2019.
Cristiano Niclass et al., "A 0.18-μm CMOS SoC for a 100-m-Range 10-Frame/s 200 × 96-Pixel Time-of-Flight Depth Sensor", IEEE Journal of Solid-Stte Circuits, Jan. 2014, pp. 315-330, vol. 49, No. 1, IEEE Service Center, Piscataway, NJ, USA.

* cited by examiner

*Primary Examiner* — Yuqing Xiao
*Assistant Examiner* — Zhengqing Qi

(57) ABSTRACT

A method for optical distance measurement is suggested, wherein a first distribution of times-of-flight of light of detected photons of transmitted measurement pulses is determined, which is stored in a first memory area of a memory unit. The first distribution of times-of-flight of light is assigned to time intervals of a first plurality of time intervals and frequency portions of the first distribution above a predetermined cut-off frequency are reduced or suppressed by means of a low pass filter in a reduction step, so that a second distribution of times-of-flight of light is generated. The second distribution is assigned to time intervals of a second plurality of time intervals and the blocking frequency of the low pass filter is selected to be smaller than or equal to half of the reciprocal value of a smallest interval width of the second plurality of time intervals.

16 Claims, 7 Drawing Sheets

METHOD AND DEVICE FOR OPTICAL DISTANCE MEASUREMENT

The present invention relates to a method for optical distance measurement, in particular by means of time-correlated single photon counting, wherein several optical measuring pulses are transmitted by at least one transmitter, wherein the optical measuring pulses are reflected on an object, wherein photons of the reflected optical measuring pulses are detected by at least one receiver, wherein a first distribution of times-of-flight of light of the detected photons is determined, wherein the first distribution of the times-of-flight of light is stored in a first memory area of a memory unit, and wherein the first distribution of times-of-flight of light is assigned to time intervals of a first plurality of time intervals.

The present invention further relates to a device for optical distance measurement, in particular by means of time-correlated single photon counting.

TECHNOLOGICAL BACKGROUND

Optical distance measurements, in particular for use in the driverless navigation of vehicles, are based on the time-of-flight principle. Most of the time, a sampling sensor, preferably a LIDAR sensor (abbreviation "Light Detection and Ranging") is used, which periodically transmits measuring pulses. The measuring pulses are reflected by objects and photons of the reflected measuring pulses are detected. By means of the speed of light, a conclusion can be drawn to the distance to the objects from the measured distribution of the times-of-flight of the detected photons of the measuring pules from the transmitter to the objects and back to the receiver.

A method and a device for optical distance measurement are known from EP 3 168 641 A1 by the applicant. In the case of the method, a transmitter matrix for transmitting measuring pulses and a receiving matrix for receiving the measuring pulses is used, wherein only sub-quantities are activated by transmitters of the transmitter matrix.

In the case of methods for optical distance measurement by means of time-correlated single photon counting (abbreviation: TCSPC distance measurement), a histogram memory, which is filled with events of detected photons in many integration cycles, is required for the full distance range. An event is thereby the measured time-of-flight of light of one of the detected photons. After completion of the integration cycle, the data from the histogram memory has to be transferred to a data processing unit for the further processing and evaluation. During the transfer, the histogram memory cannot be used for further integration cycles. Due to the fact that the distance measurement thus has to be paused for the duration of the transfer, a significant loss of integration cycles results and consequently a much deteriorated quality of the distance measurement.

So-called ping-pong memories are known from the prior art for also continuing the distance measurement for the duration of the transfer. A ping-pong memory comprises two memory areas A and B of identical size, wherein the first memory A is initially filled with data or events, respectively, in a first integration cycle. The second memory B is filled with data during the transfer of the data from the memory A to the data processing unit. The use of a ping-pong memory thus causes a doubling of the memory requirement. This is disadvantageous in particular in the case of an ASIC integration (Application Specific Integrated Circuit), because the necessary additional memory requires a large chip surface and much power.

A further problem of the method for optical distance measurement known from the prior art is that a high sampling frequency and/or a high resolution of the distance measurement gives rise to large amounts of data, which have to be transferred and evaluated within very short time intervals. The high data transfer rates associated therewith can only be provided in a complex and costly manner. In the alternative, the sampling frequency and the resolution of the distance measurement have to be reduced.

DESCRIPTION OF THE INVENTION, OBJECT, SOLUTION, ADVANTAGES

The present invention is based on the object of providing a method and a device for optical distance measurement, in particular by means of time-correlated single photon counting, wherein the memory requirement and the loss of integration cycles is reduced. The accuracy of the distance measurement is to further be improved.

To solve the object on which the invention is based, a method for optical distance measurement, in particular by means of time-correlated single photon counting, is proposed, wherein several optical measuring pulses are transmitted by at least one transmitter, wherein the optical measuring pulses are reflected on an object, wherein photons of the reflected optical measuring pulses are detected by at least one receiver, wherein a first distribution of times-of-flight of light of the detected photons is determined, wherein the first distribution of times-of-flight of light is stored in a first memory area of a memory unit, wherein the first distribution of times-of-flight of light is assigned to time intervals of a first plurality of time intervals, wherein frequency portions of the first distribution of the times-of-flight of light above a predetermined cut-off frequency are reduced or suppressed by means of a low pass filter in a reduction step, so that a second distribution of times-of-flight of light is generated, wherein the second distribution of times-of-flight of light is assigned to time intervals of a second plurality of time intervals, and wherein a blocking frequency of the low pass filter is selected to be smaller than or equal to half of the reciprocal value of a smallest interval width of the second plurality of time intervals.

The transmitter is in particular an optical transmitter and can be formed as surface emitter or VCSEL (Vertical Cavity Surface Emitting Laser). The receiver can be formed as SPAD (Single Photon Avalanche Diode).

To counteract alias effects, the Nyquist-Shannon sampling theorem, also referred to as Nyquist theorem, is preferably satisfied with the selection of the blocking frequency according to the invention.

Preferably, the blocking frequency of the low pass filter and a smallest interval width of the second plurality of time intervals are thus selected as a function of one another. If a blocking frequency is already selected for the low pass filter, the smallest interval width of the second plurality of time intervals is to be selected to be smaller than or equal to half of the reciprocal value of the blocking frequency. If, vice versa, a smallest interval width of the second plurality of time intervals is selected first, the blocking frequency of the low pass filter is selected to be smaller than or equal to half of the reciprocal value of the smallest interval width of the second plurality of time intervals.

If all time intervals of the second plurality of time intervals have the same interval width, all interval widths of all time intervals of the second plurality of time intervals are to be selected to be smaller than or equal to half of the reciprocal value of the blocking frequency.

The predetermined cut-off frequency is preferably the blocking frequency of the low pass filter or the predetermined cut-off frequency corresponds to the blocking frequency of the low pass filter.

The assignment of the distribution of times-of-flight of light to time intervals of a first or a second plurality of time intervals, corresponds to a making of a histogram of the distribution of times-of-flight of light. The assignment can also take place by storing the first distribution of times-of-flight of light and/or the second distribution of times-of-flight of light in data structures, wherein the corresponding data structure is preferably a histogram or a data structure displaying a histogram, respectively, such as, for example, a list or an array. The first or second distribution of times-of-flight of light assigned to the time intervals of a first or of a second plurality of time intervals will also be referred to below as making of a histogram, histogram or binning. In terms of the present invention, these terms can be considered and can be used as equivalent.

The pulse duration of the measuring pulses can be suitably selected. The measuring pulses can in particular be shorter than 100 ns, preferably shorter than 50 ns, particularly preferably shorter than 20 ns, more preferably shorter than 10 ns, most preferably shorter than or equal to 5 ns, even more preferably approx. 1 ns.

It can more preferably be provided that the measuring pulses have a rise and/or fall time of less than 5 ns, more preferably of less than 2 ns, particularly preferably of less than or equal to 1 ns, more preferably of less than or equal to 0.5 ns, even more preferably of less than or equal to 0.2 ns, most preferably of less than or equal to 0.1 ns.

Photons of the optical measuring pulses reflected on an object are detected by the at least one receiver. A time-of-flight of light can be determined for each detected photon, starting at a point in time of the transmission of the corresponding measuring pulse, to the detection of the photon by the receiver. If a plurality of optical measuring pulses is transmitted and a plurality of photons of the transmitted measuring pulses is thus received, a first distribution of times-of-flight of light of the detected photons can be determined.

The first distribution of times-of-flight of light is preferably determined in several integration cycles and is stored in the first memory area of the memory unit.

The first distribution of times-of-flight of light can be stored in a data structure. The data structure is preferably a histogram or a data structure displaying a histogram, respectively, such as, for example, a list or an array.

The first distribution of the times-of-flight of light determined in this way can have statistical fluctuations and noise signals, which, however, do not include any distance or range information.

Due to the fact that it is technically impossible to transmit a perfect Dirac pulse from a transmitter, for example from a VCSEL transmitter, a measuring pulse always has a minimum duration. This minimum duration can be extended, but not shortened, by the measuring section. A, preferably pulsed, laser beam transmitted by the transmitter thus has a finite cross section perpendicular to the propagation direction. If the measuring pulse or the laser beam, respectively, hits a slanted object, the reflection area is increased in the propagation direction and the first distribution of the times-of-flight of light is thus stretched with respect to the detected measuring pulse duration. A widening of the first distribution of the times-of-flight of light further results due to the Doppler Effect at a relative speed of transmitter and/or receiver to the object. In addition, a transmitter, such as a laser, for example a laser diode or VCSEL laser, has a certain rise and fall time, which is usually in the magnitude of between 0.1 ns and 5 ns. Signal portions on timescales below the rise and fall time thus do not carry any range information. Due to these relationships, it can be assumed that there is a cut-off frequency corresponding to or proportional to the reciprocal value of a smallest time interval, above which range information of the measuring pulse is no longer available.

The statistical fluctuations or noise signals in the first distribution of the times-of-flight of light can be interpreted as frequency portions of the first distribution of times-of-flight of light, for example as part of a Fourier decomposition. By performing reduction step, whereby frequency portions of the first distribution of times-of-flight of light above a predetermined cut-off frequency are reduced or suppressed by means of a low pass filter, so that a second distribution of times-of-flight of light is generated, these frequency portions, in particular the statistical fluctuations or the noise signals, can be reduced or suppressed without range information for the distance measurement getting lost. A reduction of the data quantity can be attained thereby without the quality of the distance measurement deteriorating significantly.

The attained second distribution of times-of-flight of light can have a smaller memory requirement, so that in particular the use of a ping-pong memory can be forgone. It is a further advantage of the reduced memory requirement that the time for the data transfer, during which the distance measurement has to be paused, can be reduced.

The low pass filter can also be formed as bandpass filter. A bandpass filter only allows signals of a certain frequency band or passband to pass. The frequency areas below and above the passband area are thereby blocked or significantly weakened. A bandpass filter with respect to the frequency areas above the passband area thus acts like a low pass filter.

The smallest interval width of the second distribution of times-of-flight of light is preferably larger than at least one interval width of the time intervals of the first distribution of times-of-flight of light.

It can preferably be provided that the second distribution of times-of-flight of light is stored in a second memory area of the memory unit, wherein the second memory area is more preferably smaller than the first memory area.

The second distribution of times-of-flight of light can also be stored in a data structure. The data structure is preferably a histogram or a data structure forming a histogram, respectively, such as, for example, a list or an array.

By performing the reduction step, in which frequency portions of the first distribution of times-of-flight of light above a predetermined cut-off frequency are reduced or suppressed by means of a low pass filter, the first distribution of times-of-flight of light can be smoothened, so that the second distribution of times-of-flight of light has a smoother course. Statistical fluctuations and noise signals can in particular be filtered out or reduced, respectively.

In the case of a histogram display of the second distribution of times-of-flight of light, fewer time intervals or bins, respectively, are thus required. For the data structure for storing the second distribution of times-of-flight of light, this means that the memory requirement required for this storing can be reduced. The second memory area can thus be selected to be smaller than the first memory area. Due to the use of a smaller second memory area for storing the second distribution of times-of-flight of light, the entire memory requirement is thus reduced, so that the disadvantages of the use of a ping-pong memory are overcome, without resulting in a deterioration of the measuring result. The transfer of the smoothened distribution of the times-of-flight of light into the second memory area and/or out of the second memory area further requires less time, so that the distance measurement has to be interrupted or paused for a shorter period of time as compared to the method from the prior art.

The second memory area is preferably smaller than the first memory area by at least 25%, more preferably by at least 50%, particularly preferably by at least 75%, most preferably by at least 87.5%.

The second memory area is preferably smaller than the first memory area by a decimation factor of at least 1.33, more preferably of at least 2, particularly preferably of at least 4, more preferably of at least 8.

In response to the generation of the second distribution of times-of-flight of light in the reduction step, no use information for the distance measurement gets lost, which is also why this can be referred to as a loss-free compression.

It can further be provided that no optical measuring pulses are transmitted and/or detected while performing the reduction step.

The energy requirement and the required computing power of a device for carrying out the method can be reduced with this measure.

It can preferably be provided that no optical measuring pulses are transmitted by the at least one transmitter and/or that no first distribution of times-of-flight of light is determined and/or that no first distribution of times-of-flight of light is stored in the first memory area during the reduction step and/or the storing of the second distribution of times-of-flight of light in the second memory area.

In other words, the data collection can be briefly interrupted during the reduction step and/or during the storing of the second distribution of times-of-flight of light in the second memory area. This has the advantage that no additional memory area is required, in which a further first distribution of times-of-flight of light has to be temporarily stored during the reduction step and/or the storing of the second distribution of times-of-flight of light in the second memory area. The read-out of the first distribution of times-of-flight of light from the first memory area for the purpose of reducing and storing the reduced, second distribution of times-of-flight of light into the second memory area, has to in particular not be interrupted for write operations of a further first distribution of times-of-flight of light into the first memory area.

It can furthermore be provided that the second distribution of times-of-flight of light is read out from the second memory area, wherein optical measuring pulses are transmitted by the at least one transmitter during the read-out of the second memory area, and/or an, in particular further, first distribution of times-of-flight of light of detected photons is determined, and/or an, in particular further, first distribution of times-of-flight of light is stored in the first memory area of the memory unit, wherein the, in particular further, first distribution of times-of-flight of light is assigned to time intervals of the first plurality of time intervals.

The second distribution of times-of-flight of light can be read out from the second memory area and can be transmitted to a computing unit or data processing unit for further processing. From the second distribution of times-of-flight of light, the computing unit or data processing unit can determine for example an average time-of-flight of light and, by using the value of the speed of light, can determine therefrom a range to the object, on which the optical measuring pulses were reflected.

Parallel to reading out the second distribution of times-of-flight of light, a further first distribution of times-of-flight of light can be determined in a further cycle of the method. The advantage resulting therefrom is that the data collection does not have to be interrupted for reading out the second distribution of times-of-flight of light and the determination of the object range. Due to the fact that the reduced second distribution of times-of-flight of light requires less memory than the first distribution of times-of-flight of light, the second memory area can be significantly smaller than the first memory area. The memory requirement is reduced in particular as compared to a ping-pong memory. Less time is furthermore required for reading out the second distribution from the second memory area, so that the required data processing resources can be reduced and can be used for other tasks, such as, for example, the data collection. It can more preferably be provided that the second plurality of time intervals comprises fewer time intervals than the first plurality of time intervals.

The combination of reduction step and making of a histogram with reduction of the number of time intervals can also be referred to as decimation or sample rate conversion or "downsampling", respectively.

Decimation methods, methods for sample rate conversion or downsampling methods, respectively, are thus particularly preferably used for the first distribution of times-of-flight of light, in particular for the first distribution of times-of-flight of light, for which a histogram was made, i.e. for the first distribution of times-of-flight of light stored in a corresponding data structure.

By using decimation methods and/or downsampling methods, the memory requirement for the second memory area can be reduced without the quality of the distance measurement deteriorating.

In contrast to a range resolution, which is reduced from the outset, i.e. an increase of the time intervals of the first plurality of time intervals, the decimation or sample rate conversion has the advantage that a larger portion of the equally distributed noise is eliminated or reduced, respectively, by the decimation in the first distribution of the times-of-flight of light.

Due to the fact that the second plurality of time intervals comprises fewer time intervals than the first plurality of time intervals, a smaller memory requirement is further required in the second memory area for the corresponding data structure, so that an, in particular loss-free, compression of the distribution of times-of-flight of light is made possible.

This advantage is based on the knowledge that the first distribution of times-of-flight of light can be interpreted as telecommunication signal, for which telecommunication means and methods can be used. This surprising knowledge is not known from the prior art in the field of methods for optical distance measurement, in particular by means of time-correlated single photon counting.

It can more preferably be provided that the times-of-flight of light of the detected photons are correlated with a point in time of the transmission of the respective optical measuring pulse.

Due to the correlation, the time-of-flight of light corresponds of the detected photons corresponds to the sum of the distances from the transmitter to the object and from the object to the receiver, divided by the speed of light.

It can more preferably be provided that the time intervals of the first plurality of time intervals and/or of the second plurality of time intervals are of different sizes.

The first plurality of time intervals can thus have time intervals of a first interval width corresponding to a first distance resolution, and time intervals of a second interval width corresponding to a second distance resolution. For a near field resolution, time intervals corresponding to a 4 cm resolution can be selected, for example, while time intervals corresponding to a distance resolution of 8 cm can be selected for middle and far field resolution.

The second plurality of time intervals can likewise have time intervals of a first interval width corresponding to a first distance resolution, and time intervals of a second interval width corresponding to a second distance resolution.

Due to the fact that a very high resolution is not necessary in particular in the far or middle field, the memory requirement can be further reduced by the corresponding differently selected interval widths.

The individual time intervals in the first memory area and in the second memory area can in particular be addressed via an address LSB (Least Significant Bit) of the corresponding data structure.

An address LSB preferably corresponds to a distance step on the higher resolution. A distance reduction by the factor 2 can be attained, for example, by ignoring the address LSB.

The reduction step is preferably only performed for a subarea of the first distribution of times-of-flight of light and/or of the first plurality of time intervals, and/or different cut-off frequencies are selected for different subareas of the first distribution of times-of-flight of light and/or of the first plurality of time intervals.

It is possible, for example, that time intervals of a first interval width corresponding to a first distance solution, in particular corresponding to a near field resolution, and time intervals of a second interval width corresponding to a second distance resolution, in particular corresponding to a middle and/or far field resolution, are provided for the first plurality of time intervals, and that a higher cut-off frequency is selected for the time intervals of the first interval width than for the time intervals of the second interval width. After the reducing step, the memory requirement is thus reduced in particular for the far field. The selection of different cut-off frequencies is also possible, when all time intervals of the first plurality of time intervals have the same interval width. If a lower cut-off frequency is selected for the middle and/or far field resolution, the memory requirement of the second distribution of time intervals is reduced. It is generally also possible to select the cut-off frequencies for the near field and the middle or far field in such a way that the second distribution of times-of-flight of light over the entire detection area of near, middle and far field has a uniform distance resolution.

It is particularly preferably provided that the predetermined cut-off frequency is selected as cut-off or blocking frequency of the low pass filter and is determined by a pulse width and/or a pulse rise time of the optical measuring pulses.

With the determination of the cut-off or blocking frequency by the pulse rise time and/or the pulse width, the first distribution of times-of-flight of light or the histogram determined therefrom, respectively, or the corresponding data structure can be reduced and/or decimated in such a way that only the spectral portion, which includes pulse energy or range information for the distance measurement, respectively, has to be stored and evaluated in the form of the second distribution of times-of-flight of light.

A smallest interval width of the second plurality of time intervals can initially be selected to be equal to half the pulse width or to half the pulse rise time of the optical measuring pulses. The blocking frequency of the low pass filter is then selected in such a way that it is smaller than or equal to half of the reciprocal value of the smallest interval width. The blocking frequency is then smaller than or equal to the reciprocal value of the pulse width or of the pulse rise time of the optical measuring pulses. The low pass filter thus does not allow the pass-through of any frequency portions of the optical pulses, which take place on shorter timescales than the frequency portions of the pulse width or of the pulse rise time of the optical measuring pulses. With the combined selection of blocking frequency of the low pass filter and smallest interval width of the second plurality of time intervals, the Nyquist-Shannon theorem, also referred to as Nyquist theorem, is satisfied at the same time.

The cut-off or blocking frequency of the low pass filter can further be selected in such a way that it corresponds to the highest frequency carrying the range information in the measuring pulse or in the first distribution of the times-of-flight of light, respectively.

It can further be provided that the cut-off frequency corresponds to a frequency of a Fourier decomposition of the first distribution of the times-of-flight of light, wherein frequencies above the cut-off frequency contribute preferably less than 20%, more preferably less than 10%, particularly preferably less than 5%, most preferably less than 1%, to the first distribution of the times-of-flight of light.

The first and/or the second distribution of times-of-flight of light or the histograms or data structures determined therefrom, respectively, can be interpreted as telecommunication signals, which can be analyzed by means of a Fourier decomposition in the frequency domain. Only frequency portions thereby carry range information for the distance measurement, which lies below a cut-off frequency, which is determined, for example, by the rise time or by the pulse width.

Simultaneously or alternatively, the cut-off frequency cannot only be determined by the pulse rise time or the pulse width, but it can also be selected in such a way that only a predetermined signal portion of the distribution of the times-of-flight of light, which is interpreted as telecommunication signal, is suppressed or reduced.

The cut-off or blocking frequency of the low pass filter can be a frequency, at which the signal is attenuated by less than 5 dB, preferably less than 4 dB, particularly preferably less than 3 dB, in particular preferably less than 2 dB.

The selection of the cut-off frequency can further also be a function of further factors. Weather effects can thus also be used to define the cut-off frequency. Weather effects present themselves in the pulse form or in the course of the distribution of the times-of-flight of light, respectively.

The blocking frequency preferably corresponds to half the distance resolution of the second plurality of time intervals or of the corresponding histogram, respectively.

The blocking frequency of the low pass filter can be selected in such a way that an attenuation of at least 20 dB, preferably of at least 40 dB, particularly preferably of at least 60 dB, takes place above the blocking frequency.

If the low pass filter is formed as bandpass filter, the cut-off or blocking frequency of the low pass filter is to preferably be understood as the upper cut-off or blocking frequency of the bandpass filter. The blocking frequency of the low pass filter is to thus preferably be understood as the upper blocking frequency of the bandpass filter.

A DC or direct current noise offset can preferably be removed from the first distribution of times-of-flight of light by means of a high pass filter, in particular when the passband area of the, in particular combined, high pass and low pass filters lies at the frequency of the maximally expected pulse width.

It can more preferably be provided that the low pass filter is a polyphase filter and/or that the low pass filter performs a polyphase decomposition of the first distribution of the times-of-flight of light. The low pass filter and/or the polyphase filter can further be formed as wave digital filter or as polyphase-decomposed wave digital filter.

The low pass filter can further also be formed as median filter. Further suitable designs of the low pass filter are also conceivable.

By forming the low pass filter as polyphase filter or by performing a polyphase decomposition of the first distribution of the times-of-flight of light, the time period required for performing the reduction step can be significantly reduced. The time period during which no integration of measuring pulses is performed, can thus also be reduced. The method for optical distance measurement is thereby accelerated and the quality of the measuring results is increased.

The use of a polyphase decomposition advantageously leads to a reduction of the multiplication steps, which are necessary for the reduction and suppression of the higher frequency portions. Computing time can be saved thereby.

It can particularly preferably be provided that several transmitters and/or several receivers are provided, and that several first distributions of times-of-flight of light are determined, and that frequency portions of the several first distributions of times-of-flight of light above at least one predetermined cut-off frequency are reduced or suppressed by means of at least one low pass filter in the reduction step, so that several second distributions of times-of-flight of light are generated.

In a particularly preferred way, a device, which is suitable for the method, can thereby have several transmitters and/or several receivers, which are more preferably arranged in the form of a transmitter matrix and/or of a receiver matrix. A transmitter matrix or a receiver matrix, respectively, thereby consists of a line- and row-shaped arrangement of transmitters or receivers, respectively. A device, which is suitable for the method, comprising a transmitter matrix and a receiver matrix generates extremely high data rates and requires correspondingly high data processing resources for processing the distributions of times-of-flight of light or the corresponding histograms, respectively, or data structures. As calculation example, a device can be assumed, which has 100×128 transmitters and/or 100×128 receivers in a transmitter matrix or in a receiver matrix, receptively. To reach a resolution of the distance measurement of 4 cm, the time resolution of the histograms has to be 266 ps, corresponding to a sample rate of 3.76 GHz. A histogram, which covers a distance of 200 m, thus comprises 5,000 histogram bins. The histogram bins can have an 8-bit resolution. If a sample rate of 25 Hz is assumed, 320,000 histograms per second are to be transferred, corresponding to a data rate of 12.8 Gbit/s. Such a high data rate places extremely high demands on the electronic components as well as on the power consumption and the data processing speed of the device.

If the reduction steps are thus performed for the several first distributions of times-of-flight of light, the data transfer rate can be drastically lowered, whereby the costs for the method and for a device implementing the method can be lowered.

It can further preferably be provided that the reduction or suppression of the frequency portions is performed in a parallelized manner in the reduction step.

The reduction step can in particular be used in a parallelized manner for the histogram, which is generated from the first distribution of times-of-flight of light, or for the corresponding data structure, respectively. The reduction step can thereby be performed in parallel on different subquantities of the histogram bins, i.e. on a subquantity of the time intervals of the first plurality of time intervals.

If the device, which is provided for performing the method, is formed with a transmitter matrix and a receiver matrix, so that a separate first distribution of times-of-flight of light or a separate first histogram, respectively, is determined and stored in particular for every transmitter of the transmitter matrix, the plurality of first distributions of times-of-flight of light or the plurality of histograms, respectively, can be decimated or compressed in parallel in the reduction step. The parallelized performance of the reduction step can take place by means of a corresponding hardware, for example by means of several computing units, which are formed accordingly, of the data processing unit, or as part of a software implementation.

It is further preferably provided that at least one maximum is determined in the second distribution of times-of-flight of light, preferably by means of a matching filter.

The maximum of the distribution of times-of-flight of light preferably corresponds to the time-of-flight of light of the measuring pulses from the transmitter to the object back to the receiver.

Due to the fact that all range information for the distance measurement is contained in the second distribution of times-of-flight of light or in the corresponding histogram, respectively, or the data structure, the matching filter or a pulse finding algorithm, respectively, can be used for the decimated, compressed or reduced data of the second distribution of times-of-flight of light. This reduces the computing effort by the decimation or compression factor.

It can more preferably be provided that values of the second distribution of times-of-flight of light, which are assigned to the second plurality of time intervals, are interpolated.

Based on the interval width of the time intervals of the second plurality of time intervals, the second plurality of time intervals corresponds to a distance resolution. Due to interpolation of the values, the finer distance resolution of the first plurality of time intervals can be reestablished completely or can even be raised beyond the original distance resolution of the first plurality of time intervals, because more exact information about the pulse position, in particular about the position of the maximum, in the second distribution of times-of-flight of light can be obtained by means of the probability distribution in the bins, in particular by means of the use of information about the pulse width and pulse rise time of the measuring pulses. An interpolation of this type is also referred to as "upsampling" or interpolation filtering or sample rate conversion, respectively.

A limited area around the maxima, which are preferably found by means of the matching filter, can thus subsequently be interpolated again in the second distribution of times-of-flight of light, in order to obtain the original or even a higher distance resolution. For the interpolation, the matching filter can be used directly at the high frequency, i.e. the high distance resolution, because said matching filter is preferably also a low pass filter. The matching filter can in particular be formed to identify pulses in the form of a Gaussian curve.

It is preferably provided that values of the second distribution of the times-of-flight of light are determined, in particular interpolated, between support values of the second distribution of the times-of-flight of light, wherein the support values preferably correspond to central values of the time intervals of the second plurality of time intervals.

The interpolation, however, can also be used for the first distribution of times-of-flight of light, so that values of the first distribution of times-of-flight of light assigned to the first plurality of time intervals are interpolated. A more exact distance resolution can thus be attained even without first performing a reduction step.

It is then preferably provided that values of the first distribution of the times-of-flight of light between support values of the first distribution of the times-of-flight of light are determined, in particular interpolated, wherein the support values preferably correspond to central values of the time intervals of the first plurality of time intervals.

It can further preferably be provided that the determination of the, in particular interpolated, values is performed by means of a low pass filter, wherein the low pass filter is preferably the matching filter.

A method of this type is also referred to as upsampling. The upsampling can thereby preferably be performed in a limited area or intervals around a maximum, which is found by means of the matching filter, of the second distribution of times-of-flight of light.

It can preferably be provided that short or strongly localized pulses, preferably maxima, are determined in the first distribution of times-of-flight of light prior to performing the reduction step.

Short or highly localized pulses can appear when the object, from which the measuring pulses are reflected, is a strong reflector. A strong reflector reflects many photons of the transmitted measuring pulses, so that a significant maximum in the first distribution of times-of-flight of light can already be determined after one or a few interaction cycles. A maximum, which is so high and localized sharply, is suitable for quickly determining a distance to an object in a particularly advantageous manner.

It is thus advantageous to use a detection algorithm on the first distribution of times-of-flight of light or on the corresponding data structure, respectively, prior to or parallel to performing the reduction step, so as to identify short and/or strongly localized maxima. The strongly localized maxima can then be processed and/or evaluated without performing the reduction step, preferably in a separate data processing path.

It is preferably provided that the reduction step is performed on the complete histogram, in particular comprising the short and/or highly localized maxima.

It can more preferably be provided that the determined short and/or highly localized pulses and the first distribution of times-of-flight of light and/or the second distribution of times-of-flight of light are evaluated in separate data processing paths and/or evaluating steps. It is also possible that the determined short and/or highly localized pulses are joined with the second distribution of times-of-flight of light again prior to the further evaluation.

A further solution of the object on which the invention is based, lies in the provision of a device for optical distance measurement, in particular by means of time-correlated single photon counting, which is formed in particular for carrying out an above-described method, comprising at least one optical transmitter and at least one optical receiver, a data processing unit and a memory device comprising at least two memory areas, wherein the data processing unit is formed to determine a first distribution of times-of-flight of light of detected photons and to store the first distribution of the times-of-flight of light in a first memory area of the memory unit, wherein the data processing unit is formed to assign the first distribution of times-of-flight of light to time intervals of a first plurality of time intervals, wherein the data processing unit has a low pass filter and/or wherein a low pass filter is implemented in the data processing unit, wherein the data processing unit is formed to reduce or to suppress frequency portions of the first distribution of the times-of-flight of light above a predetermined cut-off frequency by means of the low pass filter in a reduction step, so that a second distribution of times-of-flight of light is generated, wherein the data processing unit is formed to assign the second distribution of times-of-flight of light to time intervals of a second plurality of time intervals, and wherein a blocking frequency of the low pass filter is smaller than or equal to half of the reciprocal value of a smallest interval width of the second plurality of time intervals.

The device, more particularly the data processing unit or the memory device can in particular be formed to perform the method steps according to the above-described method.

It is preferably provided that the data processing unit is formed to store the second distribution of times-of-flight of light in a second memory area, wherein the second memory area is more preferably smaller than the first memory area.

In particular in the case of an implementation of the device with an ASIC, the high costs associated with the use of a ping-pong memory can be reduced.

It can more preferably be provided that the device is formed to not transmit any optical measuring pulses while performing the reduction step.

It can additionally be provided that the low pass filter is a polyphase filter and/or that the low pass filter performs a polyphase decomposition of the first distribution of the times-of-flight of light.

The polyphase filter can thereby be formed as FIR filter or as polyphase FIR filter. The low pass filter and/or the polyphase filter can further be formed as wave digital filter or as polyphase-decomposed wave digital filter.

It can further be provided that several transmitters and/or several receivers are provided and that several first distributions of times-of-flight of light are determined, and that frequency portions of the several of first distributions of the times-of-flight of light above at least a predetermined cut-off frequency are reduced or suppressed by means of at least one low pass filter in the reduction step.

It is preferably furthermore provided that the several transmitters and/or the several receivers are arranged in a transmitter matrix and/or a receiver matrix, wherein a detection area can be sampled, preferably sequentially, preferably by means of selectively controlling subquantities of the several transmitters and/or of the several receivers.

By using several transmitters and several receivers in the form of a matrix and by means of the sequential sampling of the detection area, a very large number of first distributions of times-of-flight of light are generated. The high data rates required thereby for transferring the data can be significantly reduced by using the low pass filter or low pass filters of the device, so that a quicker and less computationally intensive distance measurement is made possible. The time period during which no integration cycles can be performed, is in particular highly reduced. It can further be provided that the data processing unit is formed to perform the reduction or suppression of the frequency portions in a parallelized manner.

It can further be provided that the data processing unit has a detection algorithm for determining short or highly localized pulses, preferably maxima, in the first distribution of times-of-flight of light, and that the data processing unit is preferably formed to transfer and/or to evaluate the determined short pulses and the first distribution of times-of-flight of light and/or the second distribution of times-of-flight of light in separate data pressing paths.

A further solution of the object on which the invention is based consist of a computer program product, which comprises a computer-readable memory medium, on which a program is stored, which makes it possible for a computer, after it has been loaded into the memory of the computer, to perform an above-described method, optionally in interaction with an above-described device.

BRIEF DESCRIPTION OF THE FIGURES

The invention will be described in more detail below on the basis of the figures, in which.

DETAILED DESCRIPTION OF THE FIGURES

Figure 1:
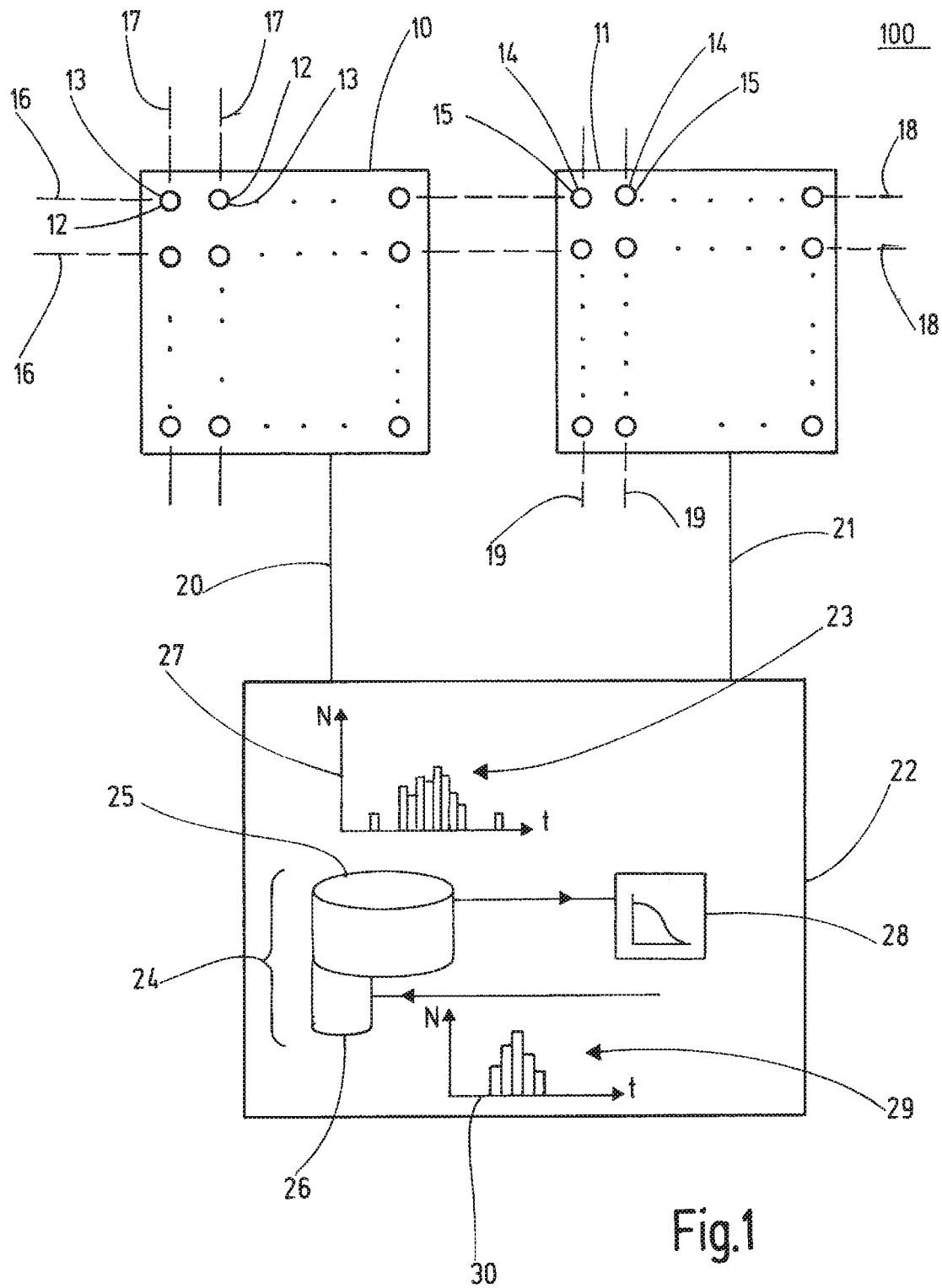
FIG. 1 shows a device for optical distance measurement, in particular by means of time-correlated single photon counting, comprising a low pass filter.

FIG. 1 shows a device 100 for optical distance measurement, in particular by means of time-correlated single photon counting.

The device 100 has a transmission matrix 10 and a receiver matrix 11. The transmitter matrix comprises transmitters 12, which are formed as VCSEL diodes 13.

The receiver matrix comprises receivers 14, which are formed as Single Photon Avalanche Diodes (SPAD) 15. The transmitters 12 of the transmitter matrix 10 are arranged in rows 16 and columns 17. The receivers 14 of the receiver matrix 11 are likewise arranged in rows 18 and columns 19. For the sake of clarity, not all transmitters 12 and receivers 14 are shown. The device 100 is formed in such a way that subgroups of the transmitters 12 can be activated sequentially and that subgroups of the receivers 14 can be activated sequentially. The correspondingly activated transmitters 12 thereby transmit optical measuring pulses, which are reflected on an object and which are detected by the receivers 14 in the form of reflected photons.

Transmitter matrix 10 and receiver matrix 11 are connected to a data processing unit 22 via data lines 20, 21.

The data processing unit 22 is formed to determine a first distribution 23 of times-of-flight of light from the measured times-of-flight of light of the photons and to store them in a memory unit 24. The memory unit comprises a first memory area 25 and a second memory area 26, wherein the second memory area 26 has a lower capacity than the first memory area 25. The data processing unit 22 is formed to assign the determined first distribution 23 of times-of-flight of light to time intervals of a first plurality of time intervals and to store them in a data structure in the first memory area 25, wherein the data structure displays a first histogram 27.

The data processing unit 22 is further formed to process the first distribution 23 stored in the first memory area 25 of times-of-flight of light or the first stored histogram 27, respectively, as telecommunication signal. For this purpose, a low pass filter 28 is provided in the data processing unit 22 or is implemented by means of software, which has a cut-off or blocking frequency. Frequency portions of the first distribution 23 of times-of-flight of light above a predetermined cut-off frequency are reduced or suppressed by means of the low pass filter 28 in a reduction step, so that a second distribution 29 of times-of-flight of light is generated. The data processing unit 22 is formed to assign the second distribution 29 of times-of-flight of light to time intervals of a second plurality of time intervals and to store them in a data structure in a second memory area 26, wherein the data structure displays a second histogram 30. While performing the reduction step and the transfer of the data from the first memory area 25 into the second memory area 26, no measuring pulses are preferably transmitted by the transmitter unit 10.

The reduction step performed by the data processing unit 22 will be described in more detail below.

Figure 2:
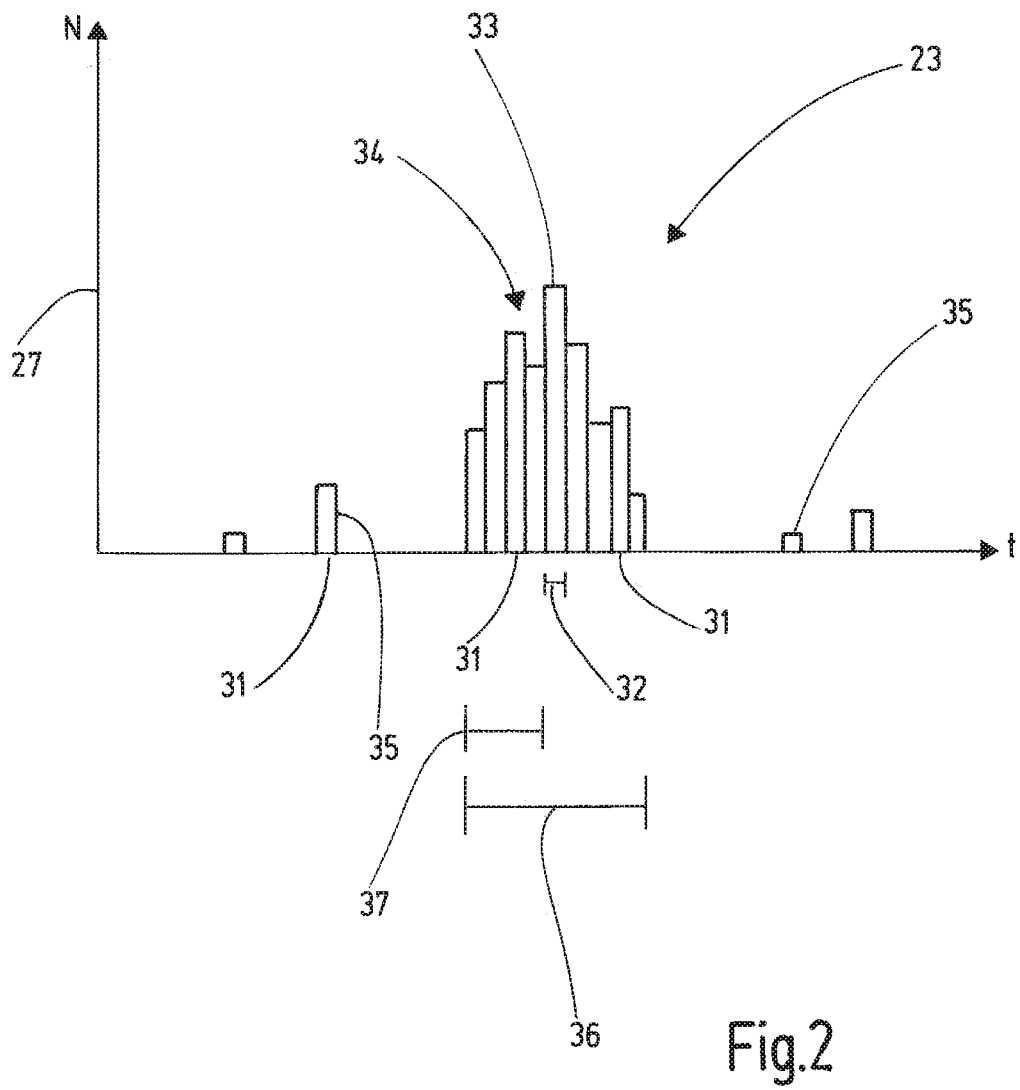
FIG. 2 shows a graphic illustration in the form of a first histogram of a first distribution of times-of-flight of light.

FIG. 2 shows the first histogram 27 generated by assignment of the first distribution 23 of times-of-flight of light to time intervals of a first plurality of time intervals. The first histogram 27 is represented by a corresponding data structure in the data processing unit 22 and the memory unit 24. The first histogram 27 is thus a graphic representation of the first distribution 23 of times-of-flight of light stored in the first memory area 25. The time-of-flight of light t is shown on the X axis of the histogram 27, the number N of the photons detected in a time interval of the time-of-flight of light is shown on the Y axis of the histogram 27. The time axis t of the histogram 27 is divided into bins 31 corresponding to the time intervals. The value N in each bin 31 corresponds to the number of photons detected over several integration cycles with a time-of-flight of light t. The interval width 32 of each bin 31 is identified with Δt. The first distribution of the times-of-flight of light 23 has a concise maximum 33. The distance to the object can be determined from the time-of-flight of light corresponding to the position of the maximum 33 and from the speed of light. The distribution 23 of times-of-flight of light, for which a histogram was made, has statistical fluctuations 34. Noise signals 35 can further be detected, which cannot be assigned to the measuring pulse. The fluctuations 34 or the noise signals 35, respectively, appear on shorter time scales than the pulse width 36 of the measuring pulse. Viewed in the frequency domain, for example after a Fourier decomposition, these fluctuations 34 and noise signals 35 correspond to signal portions of a higher frequency. It is essential that the fluctuations 34 and noise signals 35 do not include any range information for the distance measurement.

According to the invention, the first distribution 23 of times-of-flight of light illustrated in the histogram 27 is interpreted as telecommunication signal and is decimated by the low pass filter 28 in a reduction step. For this purpose, a cut-off or blocking frequency of the low pass filter 28 is defined in such a way that the higher frequencies, which correspond to the fluctuations 34 and the noise signals 35, are suppressed. The cut-off or blocking frequency is in particular selected in such a way that it corresponds to the inverse of the pulse width 36 or the pulse rise time 37 of the measuring pulses.

Figure 3:
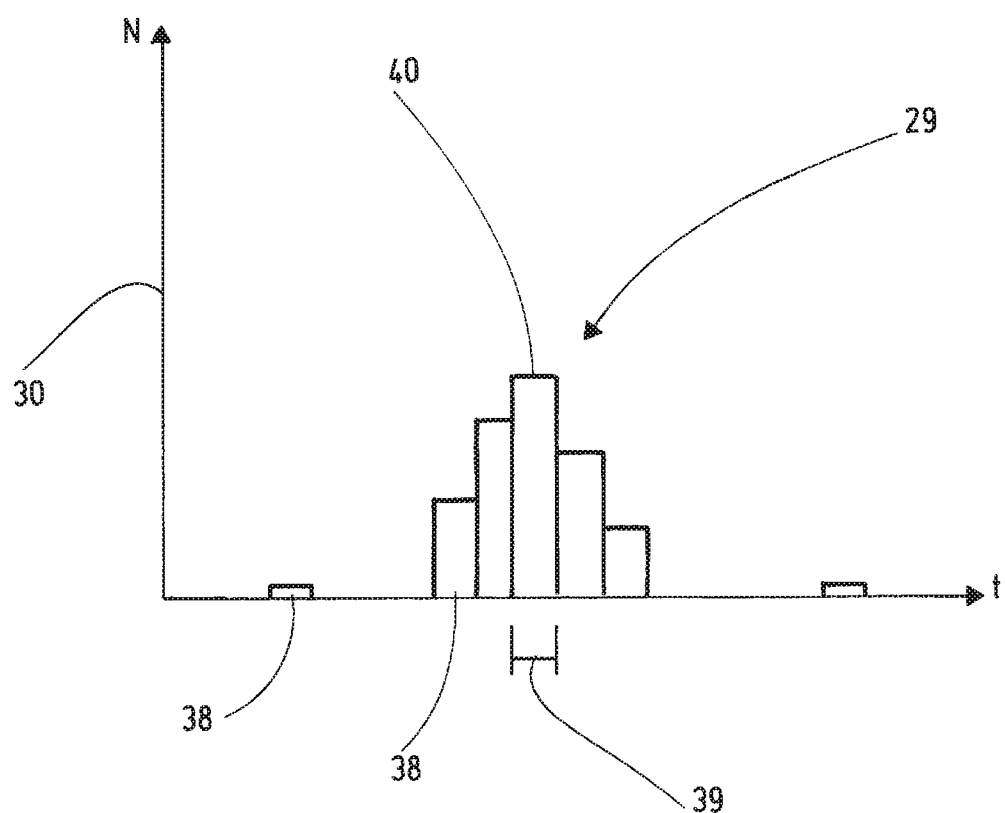
FIG. 3 shows a graphic illustration in the form of a second histogram of a second distribution of times-of-flight of light.

The second distribution 29 of times-of-flight of light attained by use of the low pass filter 28 is shown in FIG. 3. The second distribution 29 of times-of-flight of light is illustrated in the form of a second histogram 30. The bins 38 of the second histogram 30 have a larger interval width 39 than the bins 31 of the first histogram 27. The interval width 39 of the bins 38 of the second histogram 30 is, for example, half the pulse width 35 or half the pulse rise time 36 of the measuring pulse. As can be seen in the illustration of FIG. 3, the fluctuations 34 and noise signals 35 from the first histogram 27 are highly suppressed in the second distribution 29 of times-of-flight of light generated by the low pass filter 28 or are no longer present. Due to the larger interval width 39 of the bins 38 of the second histogram 30, less memory is required in the second memory area 26 of the memory unit 24 for storing the data structure corresponding to the second histogram 30. The second distribution 29 of times-of-flight of light displayed in the second histogram 30 thereby contains all of the range information.

The position of the maximum 40 of the second distribution 29 of times-of-flight of light can be determined by the data processing unit 22 by means of a matching filter. For this purpose, the resolution of the first distribution 23 of times-of-flight of light can be recovered by means of interpolation of the events N of the second distribution 29 of times-of-flight of light. It is even possible to raise the resolution beyond the resolution of the first distribution 23 of times-of-flight of light.

Figure 4:
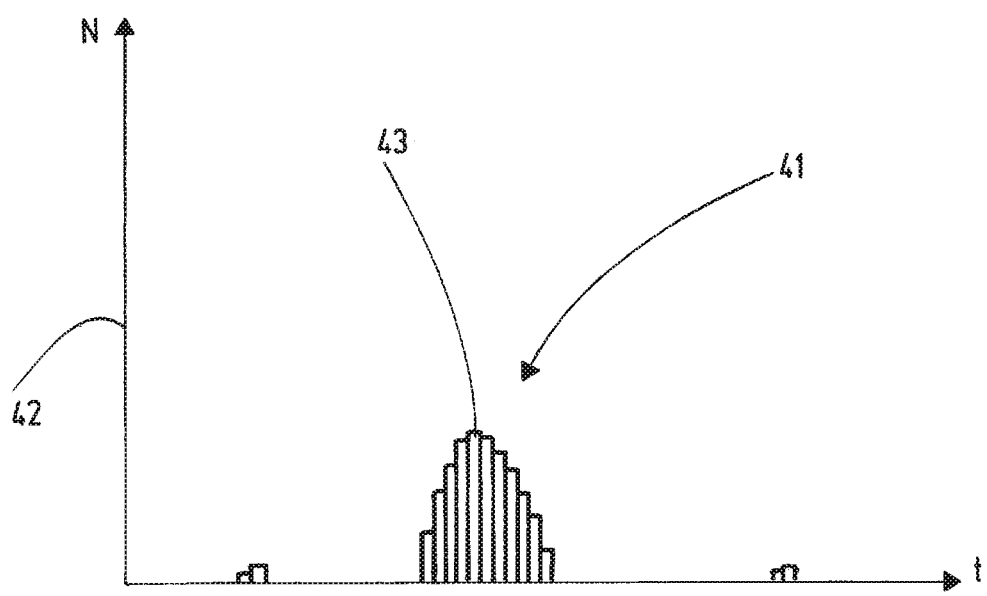
FIG. 4 shows a graphic illustration in the form of a third histogram of a third distribution of times-of-flight of light.

This can take place as follows. A second low pass filter can be used for the second distribution 29 of times-of-flight of light or to the second histogram 30, respectively. The second low pass filter is preferably the matching filter. The use of the second low pass filter or of the matching filter, respectively, provides intermediate values between the central values of the bins 38, which are illustrated in FIG. 4 in the form of a third distribution 41 of times-of-flight of light. The values of the third distribution 41 of times-of-flight of light can likewise be represented by means of a third histogram 42.

As can be seen clearly in FIG. 4, the use of the second low pass filter for the second distribution 29 of times-of-flight of light leads to a better distance resolution, that is, to a more exact determination of the position of the maximum 43 of the measuring pulse. For this purpose, information about the pulse form can be included in the matching filter, whereby the higher resolution is made possible.

The significance of the method, which is implemented by means of the device 100, is that the first distribution 23 of times-of-flight of light is interpreted and processed as telecommunication signal. By means of the reduction step, which can also be referred to as decimation step, sample rate conversion or a "downsampling", the data quantity, which has to be transferred from the first memory area 25 into the second memory area 26, can be reduced. Due to the smaller data quantity, which has to be transferred from the first memory area 25 into the second memory area 26 and which is stored in the second memory area 26, the transfer time from the second memory area 26 for the further processing is shortened. In the alternative or simultaneously, the reduction of the data quantity can also be used to reduce the data transfer speed, i.e. the bandwidth of the data transfer. The second memory area 26 can furthermore be formed to be significantly smaller than the first memory area 25.

During the transfer of the data from the first memory area 25 into the second memory area 26, the transmission of measuring pulses has to generally be interrupted, because a storing of the detected events in the first memory area 25 is not possible during the transfer. Due to the accelerated transfer of the data by means of the reduction step, this time period can be shortened greatly.

Figure 5:
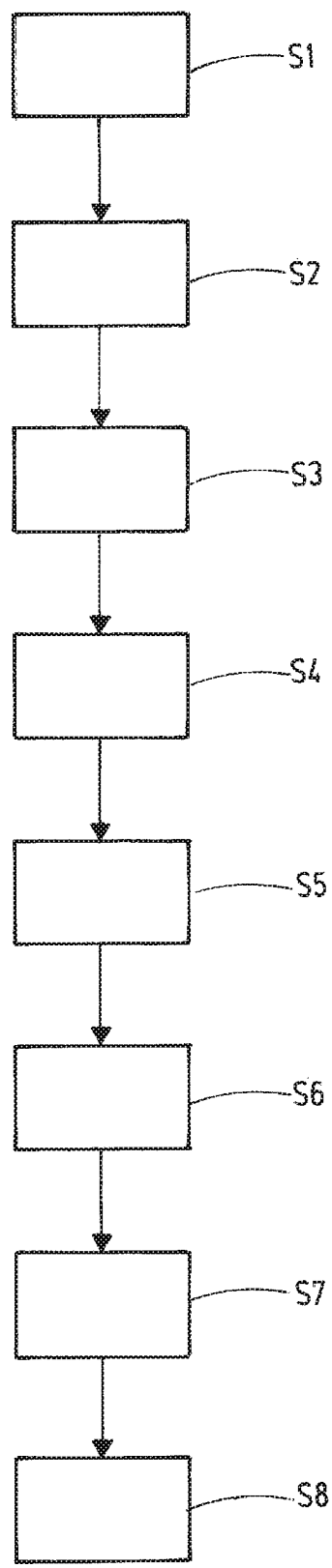
FIG. 5 shows a flowchart for a method for optical distance measurement.

FIG. 5 shows a flowchart for a method for optical distance measurement, in particular by means of time-correlated single photon counting.

In a first method step S1, several optical measuring pulses are transmitted by at least one transmitter 12. The optical measuring pulses are reflected by an object in a second method step S2, and photons of the reflected optical measuring pulses are detected by at least one receiver 14 in a third method step S3. A first distribution 23 of times-of-flight of light of the detected photons is determined, preferably by a data processing unit 22, in a fourth method step S4, and is stored in a first memory area 25 of a memory unit 24. The data can thereby be stored in a data structure, which represents a first histogram 27. Frequency portions of the first distribution 23 of times-of-flight of light above a predetermined cut-off frequency are reduced or suppressed by means of a low pass filter 28 in a method step S5, which is formed as reduction step, so that a second distribution 29 of times-of-flight of light is generated. The second distribution 29 of times-of-flight of light is stored in a second memory area 26 of the memory unit 24 in a further method step S6. The second distribution 29 of times-of-flight of light is stored in a data structure, which corresponds to a second histogram 30, wherein the interval widths 39 of the second histogram 30 are larger than the interval widths 31 of the first histogram 27. The second memory area 26 can thus be smaller than the first memory area 25.

The position of a maximum 40 of the pulse can be determined in a next method step S7, optionally by using a matching filter, for the second distribution 29, from which the distance to the object can be determined by using the speed of light.

It can optionally further be provided that the matching filter is used to perform an upsampling of the second distribution 29 of times-of-flight of light by means of interpolation in a further method step S8. Due to the fact that further information about the pulse form is present in the individual bins 38 of the second histogram 30 of the second distribution 29 of times-of-flight of light, the accuracy of the distance measurement can even be increased beyond the accuracy of the first distribution 23 of times-of-flight of light by means of the interpolation step. A cut-off frequency, which corresponds to the higher frequency of the desired higher resolution, is selected for the interpolation step.

Figure 6:
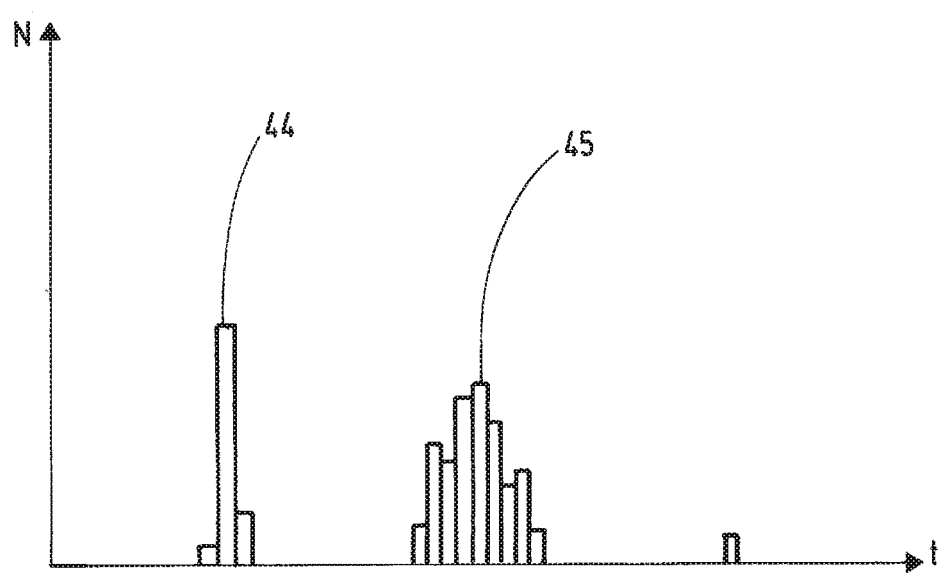
FIG. 6 shows a graphic illustration in the form of a further histogram of a distribution of times-of-flight of light comprising a highly localized maximum.

FIG. 6 shows a special case. A first maximum 44 and a second maximum 45 of measuring pulses can be seen in the histogram illustrated in FIG. 6, wherein the first maximum 44 is localized particularly strongly. The first maximum 44 and the second maximum 45 are localized spaced apart from one another in the histogram. The two maxima 44, 45 can generally also overlap one another. Maxima 44, which are localized so strongly or which are so short, appear when the object is a strong reflector, so that a very large number of photons of the measuring pulses is reflected and is detected. Such a high maximum 44 is suited particularly well for the distance measurement. It is thus not necessary to perform the reduction step for the first maximum 44, in particular because there is the risk that the first maximum 44, which is strongly localized and thus corresponds to a high frequency, is also suppressed in the reduction step. The reason for the strong localization of the first maximum 44 can be saturation effects of the receivers 14, which have the result that only the rising edge of the reflected measuring pulses is detected.

To utilize the first maximum 44 for the distance measurement, said maximum can be identified by means of a corresponding detection algorithm. The identified first maximum 44 is subsequently further processed without using the reduction step. For this purpose, a second data processing path 47, in which the first maximum 44 is evaluated in parallel, can be provided in addition to a first data processing path 46 for the second histogram 30 obtained by using the low pass filter 28.

Figure 7:
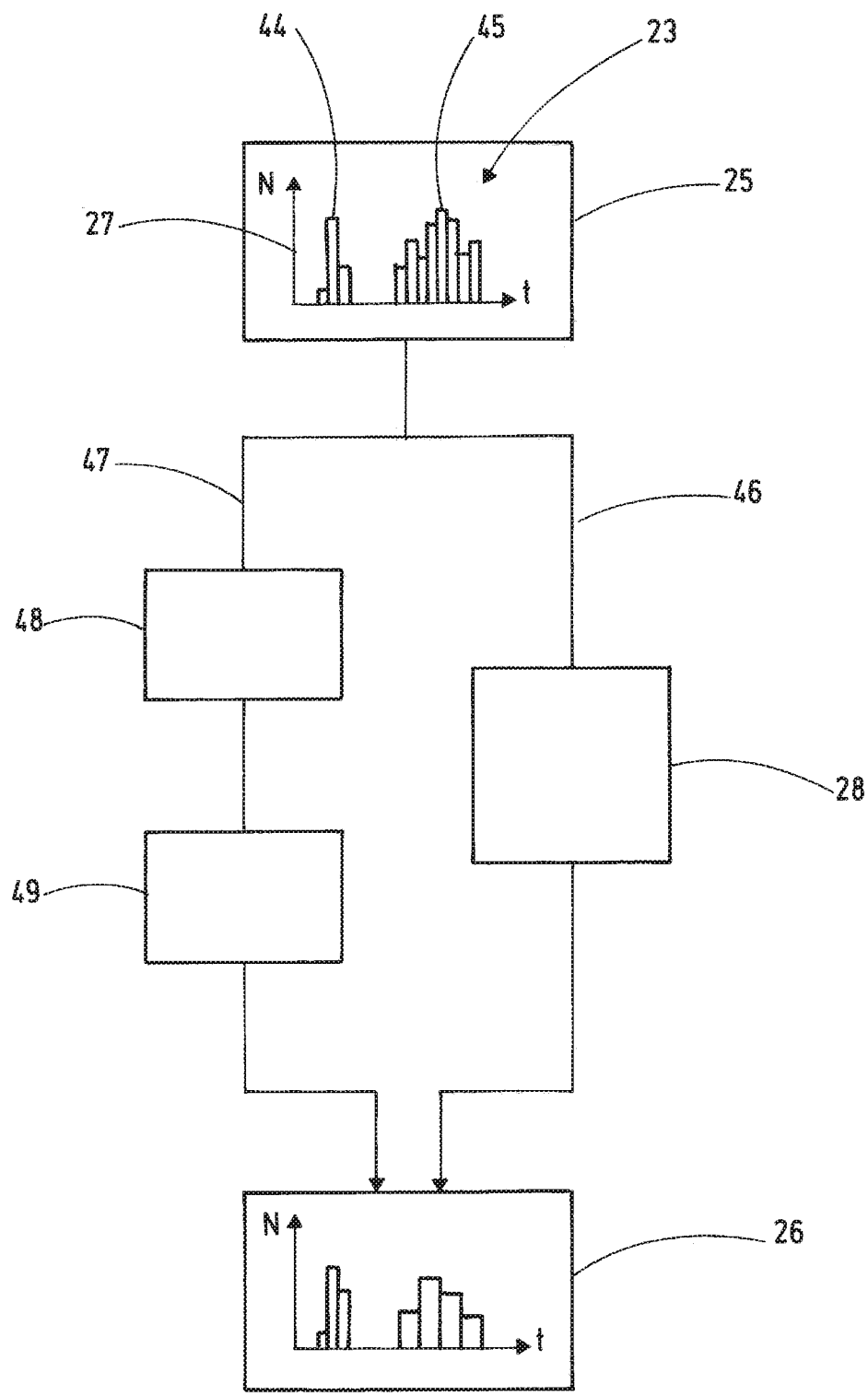
FIG. 7 shows a diagram of the evaluation of a distribution of times-of-flight of light in two data paths.

FIG. 7 shows such a parallel processing. The first distribution 23 of times-of-flight of light is stored in the first memory area 25 as data structure for a first histogram 27. The reduction step is used for the first distribution 23 of times-of-flight of light in a first data processing path 46 by means of the low pass filter 28. A sharply localized first maximum 44 in the first distribution 23 of times-of-flight of light is detected in parallel via a second data processing path 46 by means of a first software module 48 for a detection algorithm. The sharply localized maximum 44 is subsequently isolated by a second software module 49. The data processing paths 46, 47 are joined and the joined data is stored in the second memory area 26 as histogram and is subsequently further processed.

The invention claimed is:

1. A method for optical distance measurement, wherein several optical measuring pulses are transmitted by at least one transmitter, wherein the optical measuring pulses are reflected on an object, wherein photons of the reflected optical measuring pulses are detected by at least one receiver, wherein a first distribution of times-of-flight of light of the detected photons is determined, wherein the first distribution of the times-of-flight of light is stored in a first memory area of a memory unit, wherein the first distribution of times-of-flight of light is assigned to time intervals of a first plurality of time intervals, wherein frequency portions of the first distribution of times-of-flight of light above a predetermined cut-off frequency are reduced or suppressed by means of a low pass filter in a reduction step, so that a second distribution of times-of-flight of light is generated,
wherein the second distribution of times-of-flight of light is assigned to time intervals of a second plurality of time intervals, and that the cut-off frequency of the low pass filter is selected to be smaller than or equal to half of the reciprocal value of a smallest interval width of the second plurality of time intervals.

2. The method according to claim 1, wherein the second distribution of times-of-flight times is stored in a second memory area of the memory unit, wherein the second memory area is smaller than the first memory area.

3. The method according to claim 1, wherein during the reduction step and/or the storing of the second distribution of times-of-flight of light in the second memory area no optical measuring pulses are transmitted by the at least one transmitter and/or that no first distribution of times-of-flight of light is determined and/or that no first distribution of times-of-flight of light is stored in the first memory area.

4. The method according to claim 1, wherein the second plurality of time intervals comprises fewer time intervals than the first plurality of time intervals.

5. The method according to claim 1, wherein the reduction step is only performed for a subarea of the first distribution of times-of-flight of light of the first plurality of time intervals, and/or the reduction step is performed such that different cut-off frequencies are selected for different subareas of the first distribution of times-of-flight of light of the first plurality of time intervals.

6. The method according to claim 1, wherein the predetermined cut-off frequency is selected as cut-off frequency of the low pass filter and is determined by a pulse width and/or a pulse rise time of the optical measuring pulses, and/or that the cut-off frequency corresponds to a frequency of a Fourier decomposition of the first distribution of the times-of-flight of light, wherein frequencies above the cut-off frequency contribute less than 20% to the first distribution of the times-of-flight of light.

7. The method according to claim 1, wherein several transmitters and/or several receivers are provided, and that several first distributions of times-of-flight of light are determined, and that frequency portions of the several first distributions of times-of-flight of light above at least one predetermined cut-off frequency are reduced or suppressed by means of at least one low pass filter in the reduction step, so that several second distributions of times-of-flight of light are generated.

8. The method according to claim 1, wherein the reduction or suppression of the frequency portions is performed in a parallelized manner in the reduction step, and/or that at least one maximum is determined in the second distribution of times-of-flight of light.

9. The method according to claim 1, wherein values of the second distribution of the times-of-flight of light are determined between support values of the second distribution of the times-of-flight of light, wherein the support values correspond to central values of the time intervals of the second plurality of time intervals, wherein the determination of the values of the second distribution between the support values of the second distribution is performed by means of a low pass filter.

10. The method according to claim 1, wherein short or strongly localized pulses are determined in the first distribution of times-of-flight of light prior to performing the reduction step, wherein the determined short or strongly localized pulses and the first distribution of times-of-flight of light are evaluated in separate data processing paths.

11. A device for optical distance measurement formed for carrying out a method according to one of the aforementioned claims, comprising at least one optical transmitter and at least one optical receiver, a data processing unit and a memory device comprising at least two memory areas, wherein the data processing unit is formed to determine a first distribution of times-of-flight of light of detected photons and to store the first distribution of the times-of-flight of light in a first memory area of the memory unit, wherein the data processing unit is formed to assign the first distribution of times-of-flight of light to time intervals of a first plurality of time intervals, wherein the data processing unit has a low pass filter and/or wherein a low pass filter is implemented in the data processing unit, wherein the data processing unit is formed to reduce or to suppress frequency portions of the first distribution of the times-of-flight of light above a predetermined cut-off frequency by means of the low pass filter in a reduction step, so that a second distribution of times-of-flight of light is generated,
wherein the data processing unit is formed to assign the second distribution of times-of-flight of light to time intervals of a second plurality of time intervals, and that the cut-off frequency of the low pass filter is smaller than or equal to half of the reciprocal value of a smallest interval width of the second plurality of time intervals,
wherein the data processing unit has a low pass filter to determine values of the second distribution between support values of the second distribution, and wherein the data processing unit has a detection algorithm for determining short or highly localized pulsed in the first distribution of times-of-flight of light.

12. The device according to claim 11, wherein the data processing unit is formed to store the second distribution of times-of-flight of light in a second memory area, wherein the second memory area is smaller than the first memory area.

13. The device according to claim 11, wherein the low pass filter is a polyphase filter and/or that the low pass filter performs a polyphase decomposition of the first distribution of the times-of-flight of light.

14. The device according to claim 11, wherein several transmitters and/or several receivers are provided, and that several first distributions, of times-of-flight of light are determined, and that frequency portions of the several first distributions of times-of-flight of light above at least one predetermined cut-off frequency are reduced or suppressed by means of at least one low pass filter in the reduction step, and/or that the several transmitters and/or the several receivers are arranged in a transmitter matrix and/or a receiver matrix, wherein a detection area is sampled, by means of selectively controlling subquantities of the several transmitters and/or of the several receivers.

15. A computer program product, which comprises a non-transitory computer-readable memory medium, on which a program is stored, which makes it possible for a computer, after it has been loaded into the memory of the computer, to perform a method according to claim 1.

16. A computer program product, which comprises a non-transitory computer-readable memory medium, on which a program is stored, which makes it possible for a computer, after it has been loaded into the memory of the computer, to perform a method according to claim 1 in interaction with a device according to claim 11.

* * * * *